US012721768B2

(12) United States Patent
Guillemette et al.

(10) Patent No.: US 12,721,768 B2
(45) Date of Patent: Sep. 1, 2026

(54) SUPPORT SURFACE HAVING A SLEEVE FOR AN X-RAY CASSETTE

(71) Applicant: UMANO MEDICAL INC., L'Islet (CA)

(72) Inventors: André Guillemette, Levis (CA); Josée Roberge, Ste-Brigitte de Laval (CA); Claude Bernier, Ste-Brigitte de Laval (CA); Sylvain Lacasse, Quebec (CA); Vincent Lafontaine, Gatineau (CA); Audrey Lainé, Levis (CA); Pierre-Luc Nadeau, Levis (CA); Steve Bolduc, Beaumont (CA); Jérôme Marcotte, Levis (CA)

(73) Assignee: UMANO MEDICAL INC., L'Islet (CA)

( * ) Notice: Subject to any disclaimer, the term of this patent is extended or adjusted under 35 U.S.C. 154(b) by 0 days.

(21) Appl. No.: 19/085,303

(22) Filed: Mar. 20, 2025

(65) Prior Publication Data

US 2025/0302683 A1 Oct. 2, 2025

Related U.S. Application Data

(60) Provisional application No. 63/570,893, filed on Mar. 28, 2024.

(51) Int. Cl.
*A61G 7/05* (2006.01)

(52) U.S. Cl.
CPC .................................. *A61G 7/0503* (2013.01)

(58) Field of Classification Search
CPC ................ A61G 2210/50; A61G 7/015; A61G 7/05769; A61G 7/0503; A61G 7/05776; A61G 2210/70; A61G 7/018; A61G 2203/34; A61G 7/05792; A61G 7/072; A61G 7/0755; A61B 6/4283; A61B 6/4423; A61B 6/0407; A61B 6/04; A61B 6/0442; A61B 6/0414; A61B 6/50; A61B 6/502; A61B 6/548; A61H 2201/0146;
(Continued)

(56) References Cited

U.S. PATENT DOCUMENTS

| | | | | |
|---|---|---|---|---|
| 6,893,156 B2 * | 5/2005 | Sharpensteen | ....... | G03B 42/025 5/601 |
| 7,731,423 B2 | 6/2010 | Caminade | | |

(Continued)

FOREIGN PATENT DOCUMENTS

| | | | | |
|---|---|---|---|---|
| EP | 3530251 A2 * | 8/2019 | ........... | A47C 21/042 |

*Primary Examiner* — Madison Matthews
(74) *Attorney, Agent, or Firm* — Isabelle Chabot; Juan Carlos Ramos Perfecto

(57) ABSTRACT

A support surface for a patient support apparatus is disclosed. The support surface is adapted for supporting a patient and extends from a head end to a foot end along a longitudinal direction and between two opposite lateral sides along a transversal direction. The support surface comprises a first layer, a second layer disposed below the first layer, and a cover enclosing both layers. The cover includes an opening, and a sleeve is coupled to the cover. The sleeve, which defines an internal space, is disposed between the first and second layers. The internal space of the sleeve and the opening collaborate to allow access to the internal space from the exterior of the support surface, enabling insertion and removal of the medical device.

13 Claims, 12 Drawing Sheets

(58) Field of Classification Search
CPC .................. A61H 23/006; A61H 1/005; A61H 2205/084; A61H 23/04; G03B 42/025; G03B 42/02; G03B 42/04
USPC ... 5/601, 710, 713, 715, 600, 615, 634, 658, 5/694, 734; 378/177, 178, 208, 167, 172, 378/180, 182, 184, 188, 190, 209, 37
See application file for complete search history.

(56) References Cited

U.S. PATENT DOCUMENTS

| | | | | |
|---|---|---|---|---|
| 8,108,957 | B2 * | 2/2012 | Richards | A61H 23/04 5/734 |
| 11,540,964 | B2 | 1/2023 | Borgman | |
| 2003/0099325 | A1 * | 5/2003 | Galkin | A61B 6/0414 378/37 |
| 2003/0159219 | A1 * | 8/2003 | Harrison | A61G 7/05769 5/713 |
| 2014/0013515 | A1 | 1/2014 | Richards | |
| 2023/0071290 | A1 | 3/2023 | Smith | |
| 2023/0087344 | A1 | 3/2023 | Toms | |
| 2023/0095213 | A1 | 3/2023 | Borgman | |

* cited by examiner

SUPPORT SURFACE HAVING A SLEEVE FOR AN X-RAY CASSETTE

CROSS-REFERENCE TO RELATED APPLICATIONS

The present application claims priority from U.S. Provisional Patent Application No. 63/570,893 filed Mar. 28, 2024, the entirety of which is incorporated by reference herein.

TECHNICAL FIELD

The present generally relates to hospital mattresses. More particularly, it concerns a mattress providing a sleeve into which an X-ray cassette can be inserted.

BACKGROUND

X-ray imaging, such as radiography, is an important diagnostic tool in healthcare settings as it allows healthcare professionals to non-invasively visualize the internal structures of a patient's body, such as bones, organs, and tissues. By capturing X-ray images, doctors can, amongst other things, detect fractures, assess lung conditions, and identify abnormalities. This greatly helps guide treatment decisions and improves patient care. During radiography, an X-ray beam is passed through the body of the patient where a portion of the X-rays are either absorbed or scattered by their internal structures, and the remaining X-ray pattern is transmitted to a detector (e.g. plate, film or a computer screen) for recording or further processing by a computer. An X-ray cassette is a light-resistant container usually having a relatively flat rectangular shape and configured to hold an X-ray film or plate between two intensifying screens. The X-ray image is captured on the X-ray film by allowing the passage of X-rays through a front cover of the X-ray cassette.

Some mattresses used in medical environments, also known as patient support surfaces, provide a sleeve into which an X-ray cassette can be inserted. This allows for X-ray imaging of patients without requiring them to leave their beds, thereby limiting patient transfers which can be beneficial for the patients' comfort. It can also reduce the risk of injuries to caregivers by avoiding physical lifting or repositioning of patients which can be straining. It also facilitates maintaining the patient still during the imaging process.

However, the process of inserting an X-ray cassette into the X-ray sleeve of existing support surfaces often results in patient discomfort as the patient may feel the pressure of the rigid frame or support of the cassette beneath their back. If images are to be taken from multiples angles, multiples insertions and withdrawals of X-ray cassettes are needed within the span of minutes for the same patient, with multiplied discomfort. Furthermore, when the patient remains lying on the mattress, inserting the X-ray cassette into the support surface can be challenging. The weight of the patient tends to keep the sleeve partially closed, making it difficult for the caregiver to introduce the cassette into the sleeve. Additionally, cleaning the X-ray sleeve can also be complicated.

In view of the foregoing, there is a need for a support surface that addresses at least some of these drawbacks.

SUMMARY

The present disclosure relates to a support surface for a patient support apparatus, which is designed to accommodate a medical device within its structure while providing support for a patient.

According to one broad aspect, the support surface extends from a head end to a foot end along a longitudinal direction and between two opposite lateral sides along a transversal direction. The support surface includes a first layer, a second layer disposed below the first layer, and a cover enclosing both layers. The cover features an opening that allows access to an internal sleeve coupled to the cover and positioned between the first and second layers.

In one embodiment, the internal space of the sleeve is accessible from the exterior of the cover through the opening, enabling the insertion and removal of a medical device.

In other embodiments, the sleeve has a substantially flat rectangular shape and extends along the transversal direction from the opening. The opening may be positioned at one of the lateral sides of the cover.

In other embodiments, the cover may consist of a top cover and a bottom cover that are removably secured to each other, with the bottom cover defining the opening. In another embodiment, the opening comprises a fastener, such as a zip fastener, that can be selectively opened to allow access or closed to prevent access.

In other embodiments, the sleeve may be positioned longitudinally along a torso portion of the support surface, closer to the head end than the foot end.

In other embodiments, the sleeve may have different configurations to accommodate various medical devices. For instance, the sleeve may include a first rectangular portion and a second rectangular portion, where the second portion has a greater longitudinal size, forming a substantially L-shaped structure. In another embodiment, the sleeve includes a third rectangular portion, where the second portion is larger than both the first and third, forming a substantially T-shaped structure.

In some embodiments, the cover defines a second opening at the opposite lateral side, allowing access to the internal space of the sleeve from both sides of the support surface.

In yet another embodiment, the sleeve is removably secured to the cover and may be attached using a zip fastener or another fastening mechanism.

In other embodiments, the first layer of the support surface may serve as a comfort layer comprising a plurality of inflatable comfort bladders, which can be pressurized to a desired level, ranging from a completely deflated state to a fully inflated state.

In other embodiments, the second layer may serve as a support layer comprising inflatable support bladders and may further include a foam layer positioned below the support bladders.

In one embodiment, the medical device is an X-ray cassette, which can be inserted into and removed from the internal sleeve through the opening in the cover.

In another embodiment, the support surface may include a peripheral flap connected to one of the lateral sides, with the flap extending downward to cover the opening.

According to another broad aspect, there is provided a support surface for a patient support apparatus includes: a comfort layer for supporting a patient on the support surface; a support layer disposed below the comfort layer and contributing to support the patient on the support surface; a cover enclosing the comfort layer and the support layer; and a sleeve coupled to the cover and accessible from an exterior of the cover for inserting an X-ray cassette into an internal space defined by the sleeve, the sleeve being positioned between the comfort layer and the support layer.

According to another broad aspect, there is provided a method for operating a support surface for diagnostic imaging of a patient, the method comprising: inserting an X-ray cassette into a sleeve of the support surface disposed at a location below at least one inflatable bladder of the support surface configured to support the patient; and after inserting the X-ray cassette, deflating the at least one inflatable bladder to decrease a distance between the patient and the X-ray cassette.

In some embodiments, the X-ray cassette is inserted into the sleeve via an opening located at a longitudinally extending side of a cover of the support surface.

In some embodiments, the opening is located at a bottom cover of the mattress.

In some embodiments, the opening is a first opening and the longitudinally extending side of the cover is a first longitudinally extending side. The X-ray cassette is inserted into the sleeve via the first opening or a second opening located at a second longitudinally extending side of the cover.

In some embodiments, the sleeve is selectively detachable from the cover. In some embodiments, the method further comprises removing the sleeve for maintenance, cleaning or replacement.

In some embodiments, the method further comprises after deflating the at least one inflatable bladder, capturing an X-ray image of at least part of the patient's body in the X-ray cassette.

In some embodiments, the method further comprises inflating the at least one inflatable bladder after capturing the X-ray image; and after inflating the at least one inflatable bladder, removing the X-ray cassette from the sleeve.

Embodiments of the present technology each have at least one of the above-mentioned objects and/or aspects, but do not necessarily have all of them. It should be understood that some aspects of the present technology that have resulted from attempting to attain the above-mentioned objects may not satisfy these objects and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
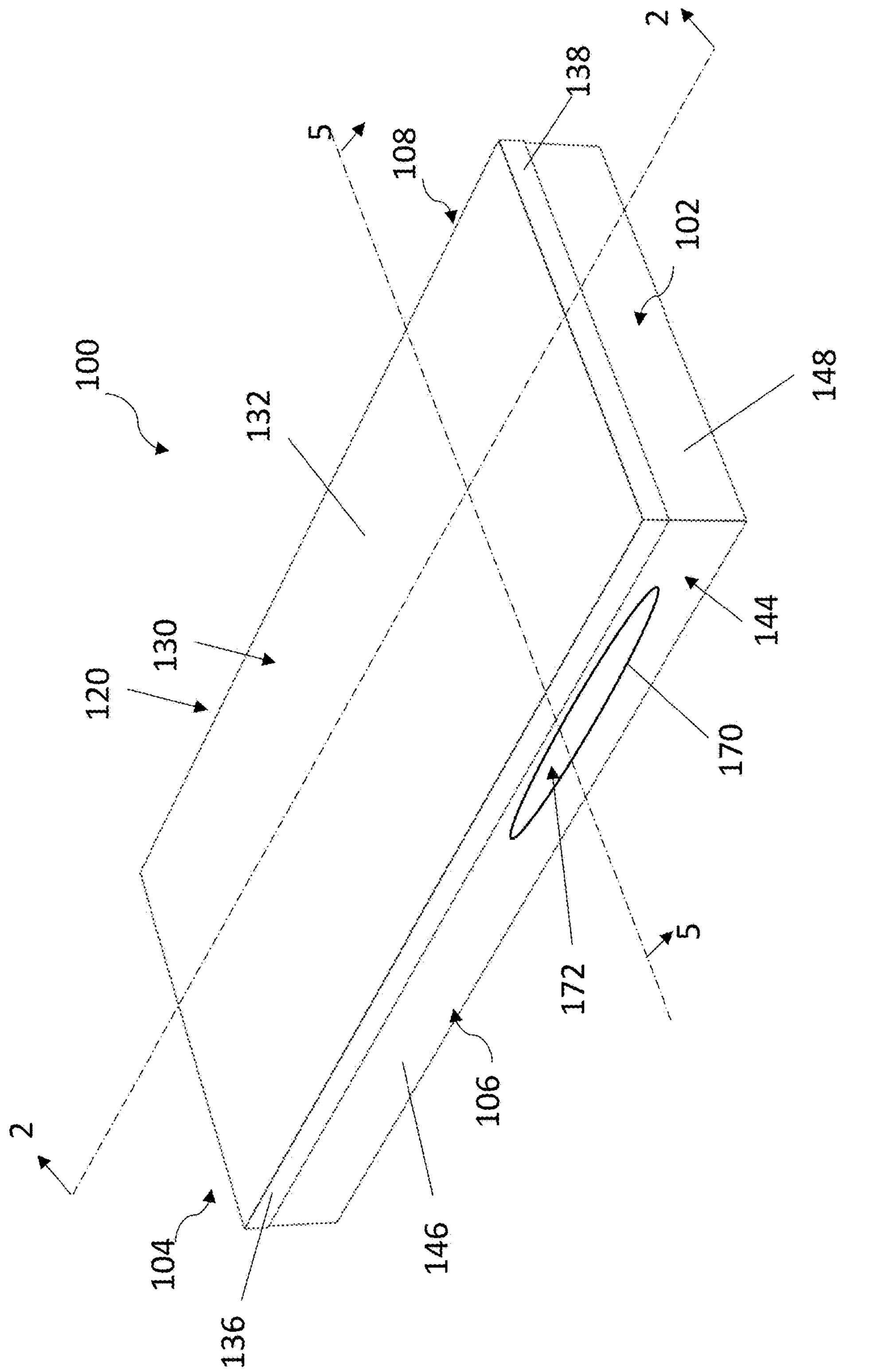
FIG. 1 is a top perspective view of an exemplary mattress with a sleeve opening.

It will be noted that throughout the appended drawings, like features are identified by like reference numerals. To not unduly encumber the figures, some elements may not be indicated in some figures if they were already identified in a preceding figure. It should be understood herein that elements of the drawings are not necessarily depicted to scale. Some mechanical or other physical components may also be omitted in order to not encumber the figures.

DETAILED DESCRIPTION

Figure 2:
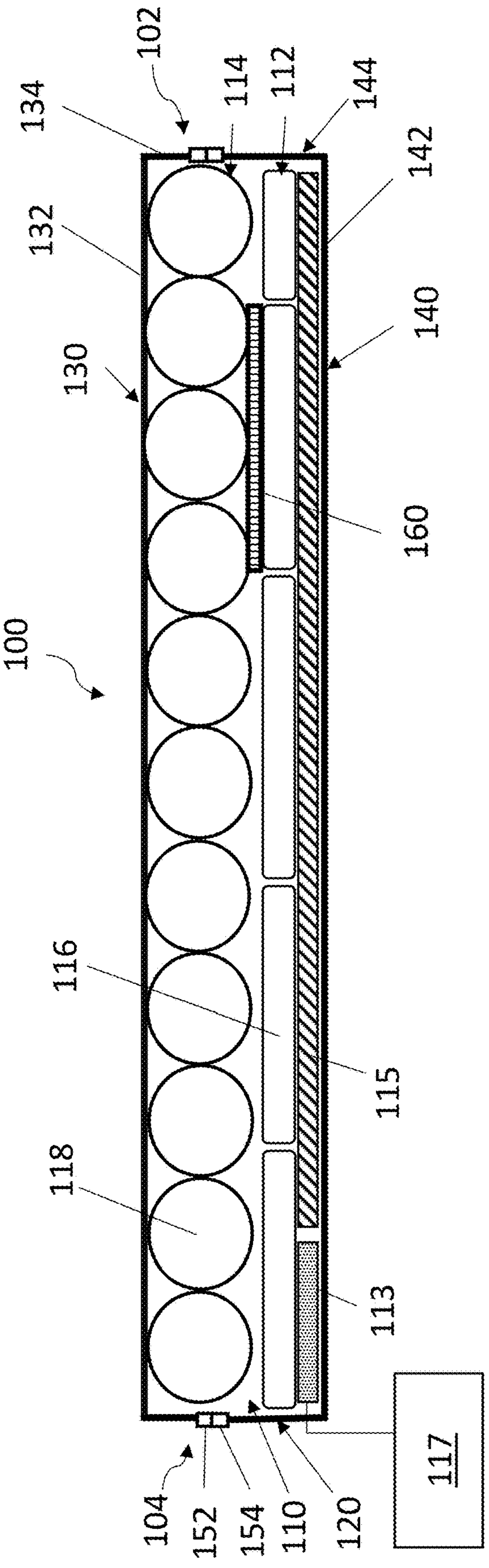
FIG. 2 is a cross-sectional view of the mattress of FIG. 1 taken along line 2-2 in FIG. 1.

Referring to FIGS. 1 and 2, a mattress 100, in accordance with an embodiment of the present technology, will be described herein. The mattress 100 may be used in a medical setting for supporting a patient. The mattress 100 may alternatively be referred to as a "support surface". The mattress 100 is usable in combination with a patient support apparatus such as a hospital bed (e.g., an intensive care unit (ICU) bed or a therapeutic bed). As will be explained in more detail below, the mattress 100 has a sleeve 160 (FIG. 2) in which an X-ray cassette 190 (FIG. 3) can be inserted through opening 172 for enabling diagnostic imaging of the patient as they lie on the mattress 100.

As best shown in FIG. 1, the mattress 100 has a head end 102 and a foot end 104 opposite the head end 102 and defining a length of the mattress 100 therebetween. As will be appreciated, in use, when the patient is lying on the mattress 100 along a longitudinal direction, the patient's head is closer to the head end 102 while the patient's feet are closer to the foot end 104. The mattress 100 also extends transversally between two opposite lateral sides 106, 108 defining a width of the mattress 100. The lateral sides 106, 108 extend longitudinally from the head end 102 to the foot end 104. As shown in FIG. 2, the mattress 100 has a mattress core 110 and a mattress cover 120 enclosing the mattress core 110. The mattress core 110 provides support for the patient and may include pneumatic, foam or latex, material or fiber, spring or coil components or a combination of these.

In this embodiment, as shown in FIGS. 2 to 5, the mattress core 110 includes a first layer, such as a support layer 112, and a second layer, such as a comfort layer 114, disposed above the support layer 112. The support layer 112 provides a firm base for the mattress core 110 while the comfort layer 114 is in more direct contact with the patient lying on the mattress 100. The comfort layer 114, supported by the support layer 112, contributes to the comfort of the patient and to preventing them from developing bed sores. Together, both layers 112, 114 support the patient on the mattress 100. It is contemplated that, in some embodiments, a single one or multiple ones of the layers 112, 114 may be provided.

In this embodiment, the comfort layer 114 includes a plurality of inflatable comfort bladders 118 that can be selectively inflated and deflated. In this example, the comfort bladders 118 are transversally oriented (i.e., they extend in a transversal direction of the mattress 100). It is contemplated that the comfort bladders 118 could be oriented differently in other embodiments. The comfort bladders 118 may have a cylindrical shape, but other shapes may be used. The comfort bladders 118 are mounted together side by side from the head end to the foot end and extend transversally across at least a substantial portion of the width of the mattress.

Figure 3:
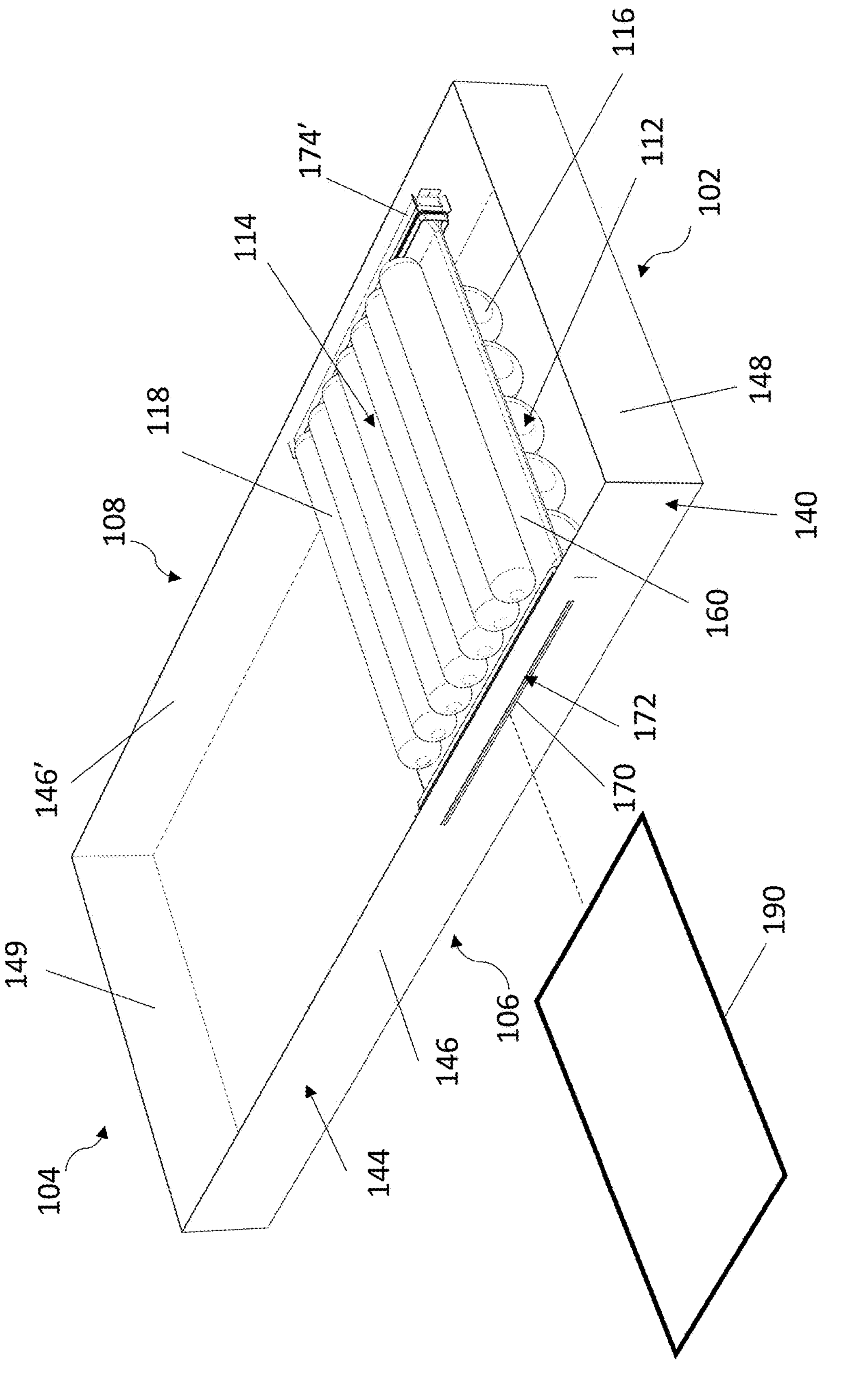
FIG. 3 is a perspective view of a part of the mattress of FIG. 1 shown without its top cover to visualize at least some internal components of the mattress and showing a sleeve for receiving an X-ray cassette.
Figure 4:
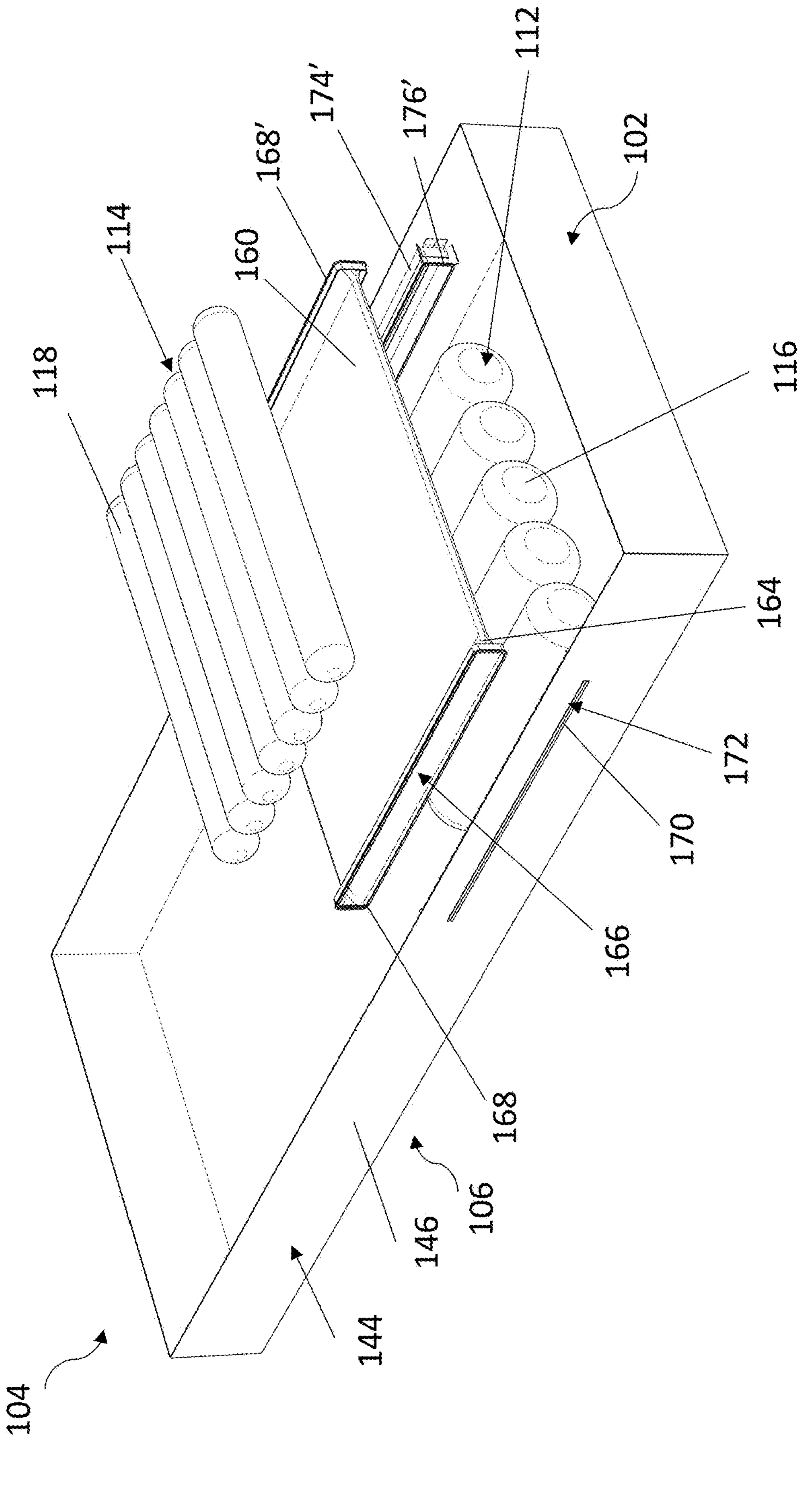
FIG. 4 is an exploded view of the part of the mattress shown in FIG. 3.

In this embodiment, as best shown in FIGS. 3 and 4, the support layer 112 includes a plurality of inflatable support bladders 116. The support bladders 116 are longitudinally oriented (i.e., they extend in a longitudinal direction of the mattress 100). The support bladders 116 could be oriented differently in other embodiments.

Figure 5:
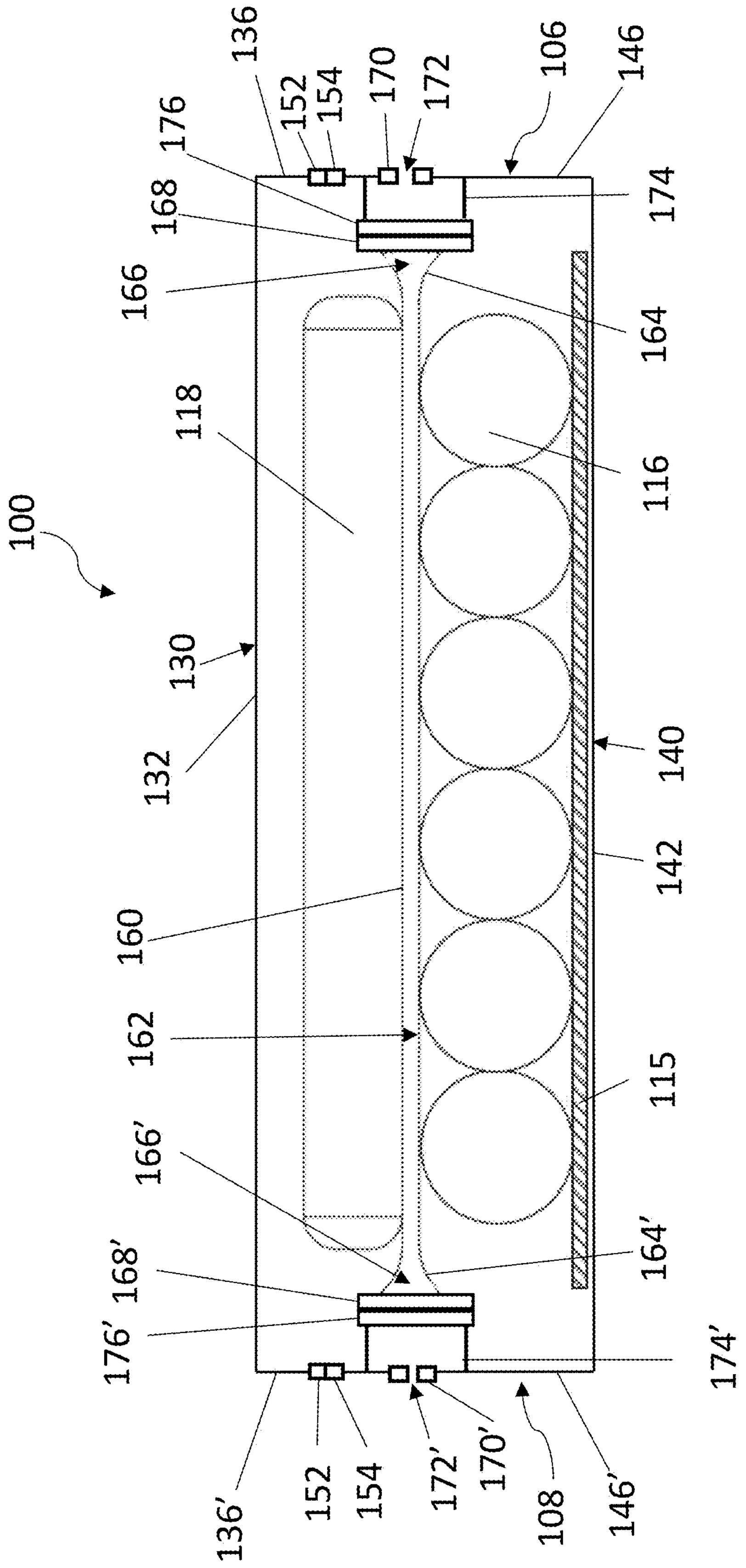
FIG. 5 is a cross-sectional view of the mattress of FIG. 1 taken along line 5-5 in FIG. 1.

In this embodiment, as shown in FIGS. 2 and 5, the mattress core 110 may also comprise a foam layer 115 below the support layer 112. The foam layer 115 may impart additional rigidity to the mattress 100.

In this embodiment, the mattress 100 includes various controlled inflatable components in fluid communication with a pneumatic control assembly 113 (FIG. 2) which controls air flow to the various air-powered components of the mattress 100. This may enable the mattress 100 to provide a range of therapeutic functionalities. As can be seen, in this example, the pneumatic control assembly 113 is enclosed within the mattress cover 120 and is disposed underneath the support layer 112 at a foot portion of the mattress 100. The pneumatic control assembly 113 could be disposed elsewhere along the mattress 100 in other embodiments. Moreover, in other embodiments, the pneumatic control assembly 113 could be disposed externally of the mattress 100, for example in a separate control unit that can be disposed next to the mattress 100 (e.g., at a foot end of the bed on which the mattress 100 is disposed). In this embodiment, the pneumatic control assembly 113 is integrated into the bed to operate and control the mattress 100 as desired and is in communication with a control unit and associated user interface 117 (FIG. 2).

The pneumatic control assembly 113 may include one or more controller units, one or more processors, one or more memories, one or more input/output interfaces and communication interfaces (not shown). It will be appreciated that the pneumatic control assembly 113 is an implementation of a computing device. The mattress 100 or the hospital bed on which it is typically provided may further include a control interface (not shown) operatively connected to the pneumatic control assembly 113 and configured for receiving user inputs for controlling features of the bed or mattress and outputting information relating to the features of the bed, the mattress and/or the patient. The control interface could be integrated into the footboard, into the headboard or into one or more of the siderails of the bed. Alternatively, the control interface could be integrated into the mattress. Alternatively it could be provided as a separate unit located near the bed or mattress or even at a location remote from the bed or mattress.

As shown in FIGS. 2 and 5, the mattress cover 120 includes a top cover 130 and a bottom cover 140 that are attached to one another. The top cover 130 includes a top portion 132 and four peripheral upper portions 134 that extend downwardly from the edges of the top portion 132. The top portion 132 defines an upper surface that, in use, is closest to the patient (e.g., directly contacts the patient if no bedding sheets are used on the mattress). The peripheral upper portions 134 include two side upper walls 136, 136' that extend longitudinally, an upper head end wall 138 and an upper foot end wall 139 that extend transversally.

As best shown in FIGS. 3, the bottom cover 140 includes a bottom portion 142 and peripheral lower portions 144 that extend upwardly from the edges of the bottom portion 142. The bottom portion 142 defines a lower surface that faces the bed (i.e., away from the patient) when the mattress is provided on a hospital bed or other surface. The peripheral lower portions 144 include two side lower walls 146, 146' that extend longitudinally along the lateral sides of the bottom cover 140, a lower head end wall 148 and a lower foot end wall 149 that extend transversally.

As best shown in FIG. 5, an upper attachment element 152 and a lower attachment element 154 are connected to the top and bottom covers 130, 140 respectively. The upper and lower attachment elements 152, 154 collaborate together to selectively fasten the top cover 130 to the bottom cover 140 and enclose the mattress core 110. In this embodiment, the upper and lower attachment elements 152, 154 are zip fasteners that engage one another to connect the top cover 130 and the bottom cover 140. It is contemplated that other types of attachment elements could be used in other embodiments. It is also contemplated, in another embodiment, that the bottom cover and the top cover are permanently connected together thus constituting a continuous cover, with or without a visible delimitation between the top and bottom covers.

With reference to FIGS. 2 to 5, the mattress 100 includes sleeve 160 for receiving a medical device or equipment, for example the X-ray cassette 190, and thereby enable X-ray imaging of the patient lying on the mattress 100. The sleeve 160 is disposed within the mattress and is coupled thereto as will be described in greater detail below. The sleeve can also be referred to as a pocket, a cover, a case, an envelope, an insert or a sheath. The medical device may be any accessory or device used in the care and/or treatment of the patient and therefore need not necessarily be used for X-ray imaging. It could for example be a cooling mat or pad, a warming mat or pad, a rigid board or insert, a wedge pad, a removable bed rail, a removable table insert, etc.

The sleeve 160 is an assembly of fabric defining an internal space 162 (FIGS. 5 and 6) that is sized and shaped to receive the X-ray cassette 190 therein. It can be tubular in one embodiment. The sleeve 160 extends between two open lateral ends 164, 164' that are coupled to the mattress cover 120. Notably, the open lateral ends 164, 164' respectively define a first lateral opening 166 and a second lateral opening 166' (FIG. 5). The lateral openings 166, 166' are arranged on both lateral sides 106, 108 and are in communication with the internal space 162. In this embodiment, the internal space can be accessed from either side of the mattress.

Returning to FIGS. 2 to 5, in this embodiment, the sleeve 160 is positioned along a torso portion of the mattress 100 (i.e., a portion of the mattress 100 that, in use, is generally aligned with a torso of the patient, namely closer to a head end and further from a foot end). In another embodiment, the sleeve is an extended rectangular sleeve that extends along most of the length of the mattress 100, to allow to obtain a longer X-ray image of the patient lying on the mattress 100, for example a full body image. In this case, an extended opening that extends longitudinally from the head end 102 to the foot end 104 of the mattress 100 could be used or a shorter opening could be provided and X-ray cassettes would be inserted and slid within the internal space to position them under the body part to be imaged.

Sleeve 160 is disposed between the support and comfort layers 112, 114, namely beneath the comfort layer 114 and above the support layer 112. This positioning may prevent or otherwise minimize patient discomfort when the X-ray cassette 190 is inserted into the sleeve 160 for radiography. Notably, the comfort layer 114 distances the patient from the rigid X-ray cassette 190 and thus acts as a protective barrier, at least partly shielding the patient from potential harm or discomfort caused by the insertion of the X-ray cassette 190. The placement of the sleeve 160 between two pneumatic layers may facilitate insertion of the X-ray cassette 190 into the sleeve 160, notably as the pneumatic support and comfort layers 112, 114 tend to be more flexible than non-pneumatic alternatives.

In this embodiment, each of the side lower walls 146, 146' of the bottom cover 140 of the mattress 100 respectively defines a first opening 172 and a second opening 172' (FIG. 3) for accessing the sleeve 160. As such, the openings 172, 172' are disposed on opposite lateral sides 106, 108 of the mattress 100. Each one of the openings 172, 172' extends longitudinally along the side lower walls 146, 146'. The openings 172, 172' are positioned along the thickness of the mattress to be at or near an interface between the comfort layer 114 and the support layer 112 to avoid having to insert the cassette at an angle.

Figure 6:
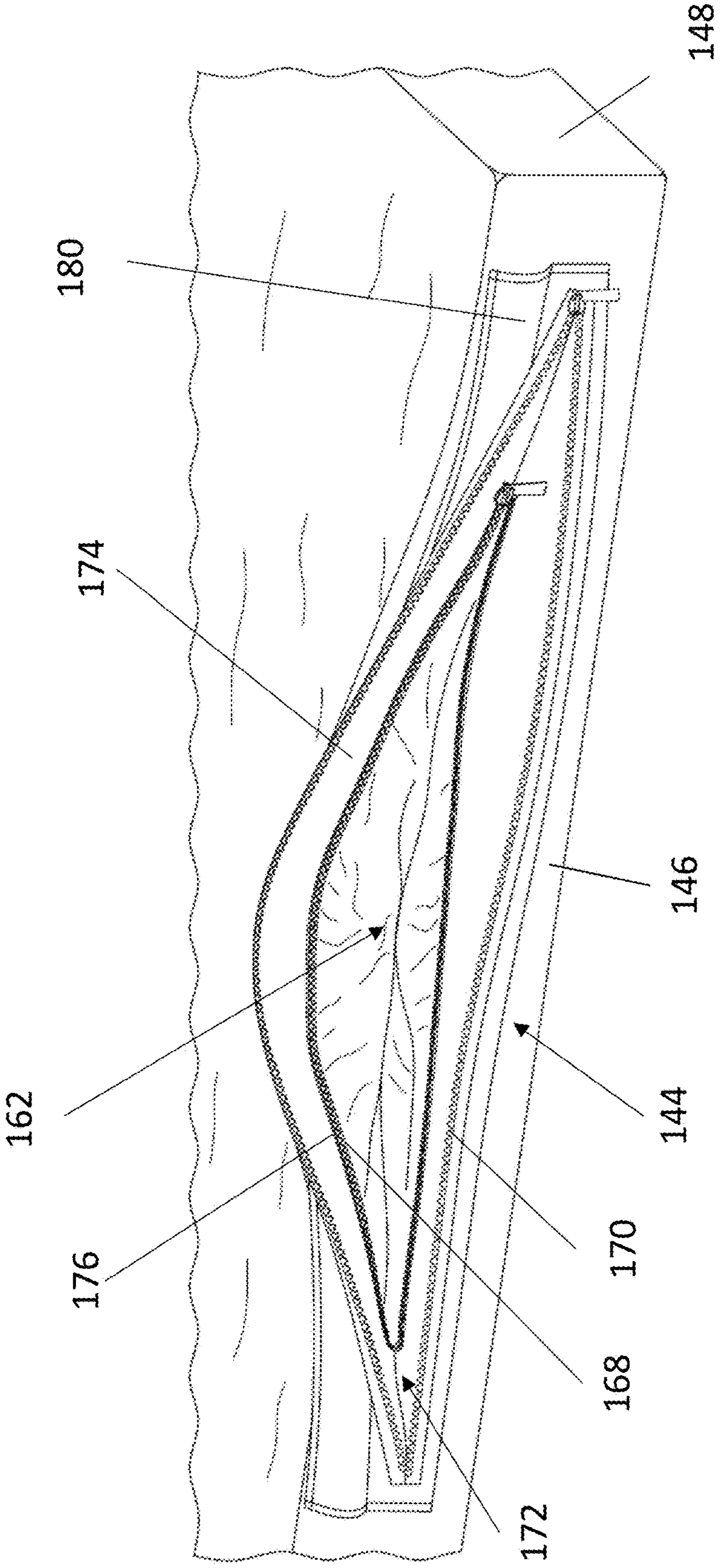
FIG. 6 is a side view of a peripheral portion of a cover of the mattress of FIG. 1, showing an opening thereof and an internal space of the sleeve.

In this embodiment, as shown in FIGS. 1 and 3 to 6, each of the side lower walls 146, 146', respectively includes an external fastener 170, 170' around the edge of the opening 172, 172' for selective opening and closing of the openings 172, 172'. In this example embodiment, the fasteners 170, 170' are zip fasteners. The fasteners 170, 170' may be other types of fasteners in other embodiments (e.g., snap buttons). The inclusion of the fasteners 170, 170' may prevent contaminants entering the sleeve 160 during use of the mattress which may facilitate cleaning of the mattress 100. It should be understood that each of the openings 172, 172' has two states: an opened state, as shown in FIGS. 1, 5 and 6 and a closed state, as shown in FIGS. 3 and 4. It is contemplated, in one embodiment, that the fasteners 170, 170' could have a different color than other fasteners of the mattress 100 to distinguish them. For example, the fasteners 170, 170' could be yellow. In another embodiment, the fasteners 170, 170' could have the same color as other fasteners of the mattress 100. It is also contemplated that, in some embodiments, the fasteners 170, 170' could be omitted. In such cases, the openings 172, 172' could always remain in opened state.

As shown in FIGS. 4 to 6, the sleeve 160 is connected to the side lower walls 144, 144' by two linking strips 174, 174' which align the respective openings 172, 172' with the internal space 162 of the sleeve 160. Each one of the linking strips 174, 174' is fastened at one lateral end thereof to the inner side of a corresponding one of the side lower walls 146, 146' near the corresponding opening 172, 172', respectively. The linking strips 174, 174' can be welded, sewn or otherwise fastened to the corresponding one of the side lower walls 144, 144' of the bottom cover 140.

The linking strips 174, 174' are also fastened to the sleeve 160. More specifically, in this embodiment, the linking strips 174, 174' are removably fastened to the respective lateral ends 164, 164' of the sleeve 160. To that end, in this embodiment, each of the linking strips 174, 174' has a first fastener element 176, 176' that is engageable with a corresponding second fastener element 168, 168' of the sleeve 160, respectively. Notably, the sleeve 160 has two fastener elements 168, 168', each of the second fastener elements 168, 168' being disposed at a corresponding one of the lateral ends 164, 164' of the sleeve 160. In particular, each of the second fastener elements 168, 168' extends around a peripheral edge of the corresponding lateral end 164, 164' of the sleeve 160. In this example, the fastener elements 176 and 168 are zip fasteners that are engageable to each other (similarly for the fastener elements 176' and 168'). This may allow a user to easily detach the sleeve 160 for disinfection or replacement. In another embodiment, the fastener elements may be different types than zip fasteners such as snap buttons.

The placement of the sleeve 160 sandwiched between the comfort and support layers 112, 114 allows part of the supporting material of the mattress 100, for example the comfort layer 114, to protect the patient from the rigidity of the X-ray cassette 190 during insertion thereof into the mattress 100, while also ensuring that the sleeve 160 is not located so deeply beneath the supporting material (e.g., below the support layer 112) that the X-ray beams have to traverse a significant amount of material when the X-ray image is being captured. With fewer layers to traverse, the X-ray beam encounters less attenuation and produces better imaging.

Figure 7:
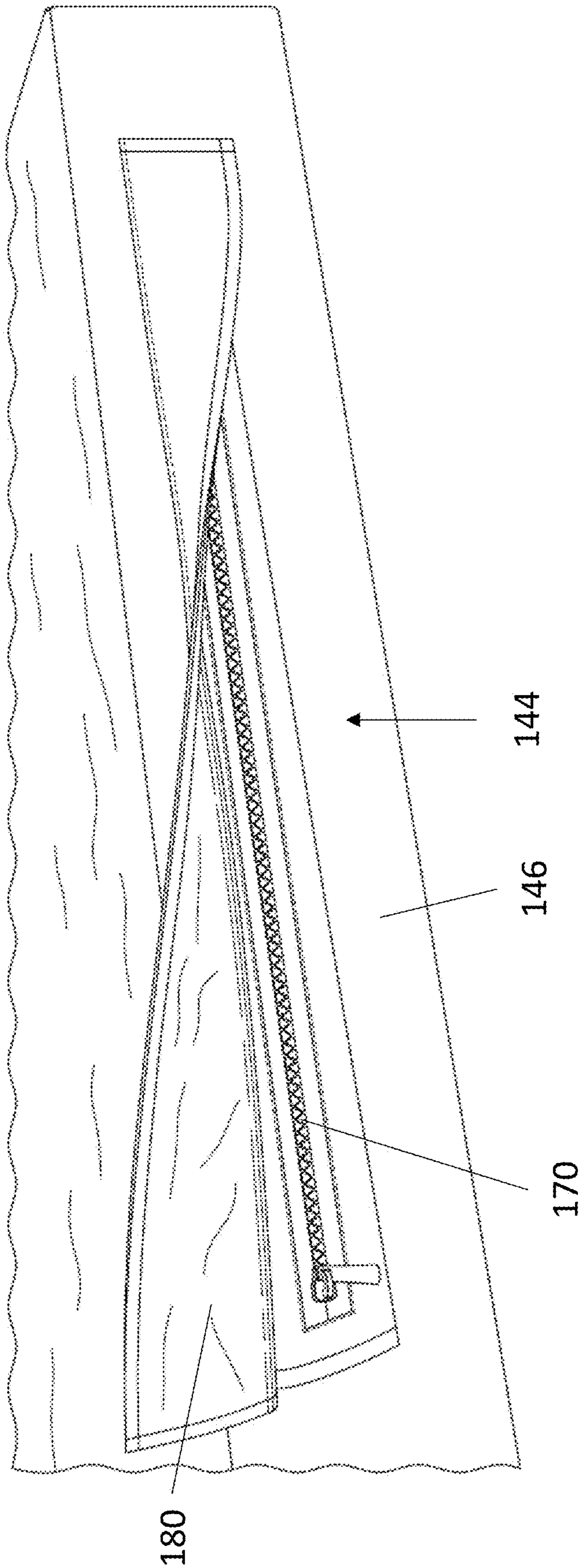
FIG. 7 is a side view of part of the peripheral portion of the cover of the mattress according to another embodiment with a flap protecting the zippered opening.

With reference now to FIG. 7, in another embodiment, a peripheral flap 180 may be connected to the mattress bottom cover 140 to protect opening 172. For instance, this may help prevent contaminants from reaching the opening 172 and/or the fastener 170 associated therewith. Another identical peripheral flap may be provided on an opposite lateral side of the mattress 100 to protect opening 172'. In this example, the peripheral flaps are connected to the bottom cover 140 and extend downwardly therefrom to cover the openings 172, 172' and the fastener 170. In FIG. 7, the peripheral flap 180 is partly lifted to show the hidden fastener 170. In use, it would typically rest fully downwardly and would require user intervention to be party or fully lifted.

The peripheral flaps may be configured differently in other embodiments. For example, in another embodiment, a continuous peripheral flap may extend downwardly from the top cover (like a skirt) and protect the fasteners 170, 170' and the fasteners 152, 154 simultaneously.

Figure 8:
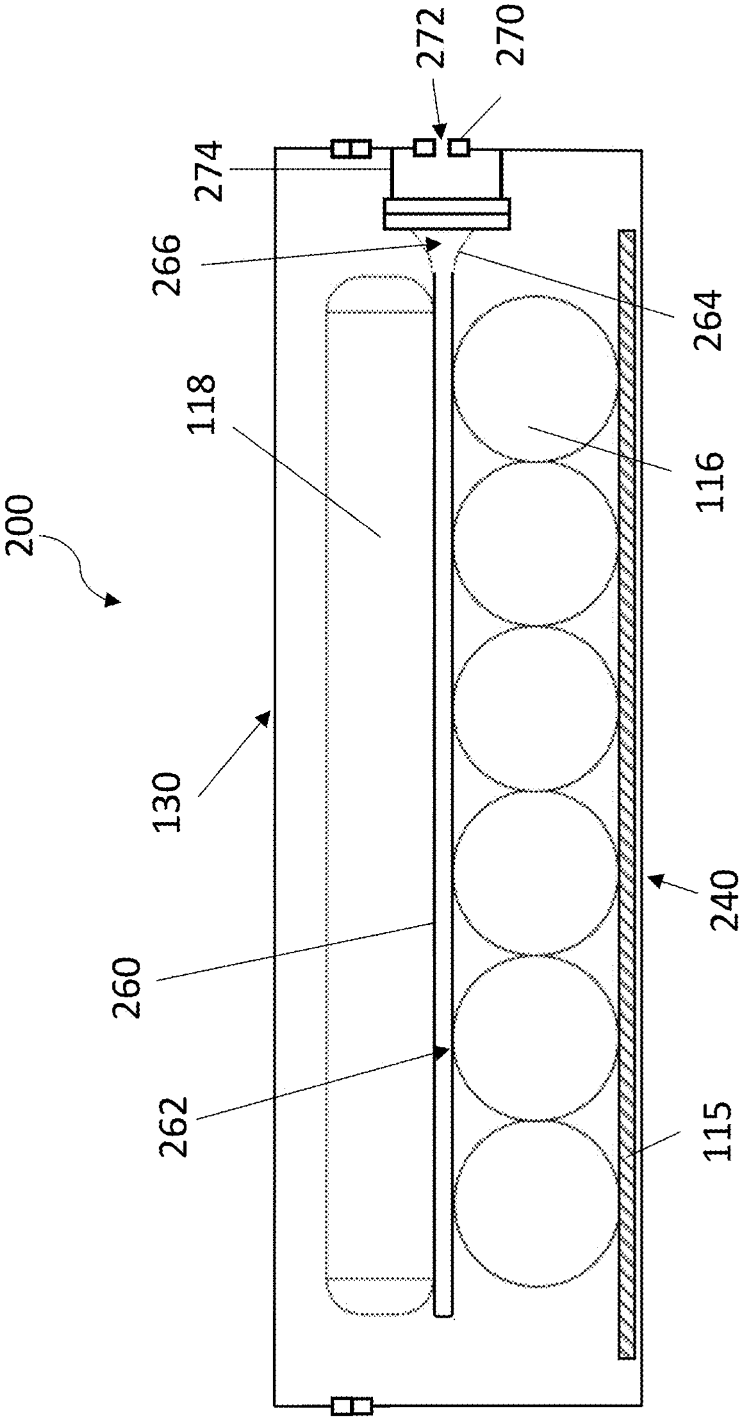
FIG. 8 is a cross-sectional view of a mattress according to another embodiment having only one opening for access to a removable sleeve.

In other embodiments, different configurations of the sleeve are provided. For example, turning now to FIG. 8, in another embodiment, a mattress 200 comprises a sleeve 260 having a single open lateral end 264 defining a single lateral opening 266. The open lateral end 264 of the sleeve 260 is connected to the bottom cover 240 by a single linking strip 274. In such a case, an internal space 262 of the sleeve 260 is accessible only from one side of the bottom cover 240 of the mattress 200 via a single opening 272. The X-ray cassette may be, therefore, inserted to and removed from the internal space 262 of the sleeve 260 from only one lateral side of the bottom cover 240 of the mattress 200. The bottom cover 240 further includes a single external fastener 270 around the edge of the opening 272 for selective opening and closing of the opening 272. It should be understood here that the mattress 200, shown in FIG. 8, includes elements that are the same or similar to those described with reference to the mattress 100. Therefore, these references have been labeled with the same reference numerals of the mattress 100.

Figure 9:
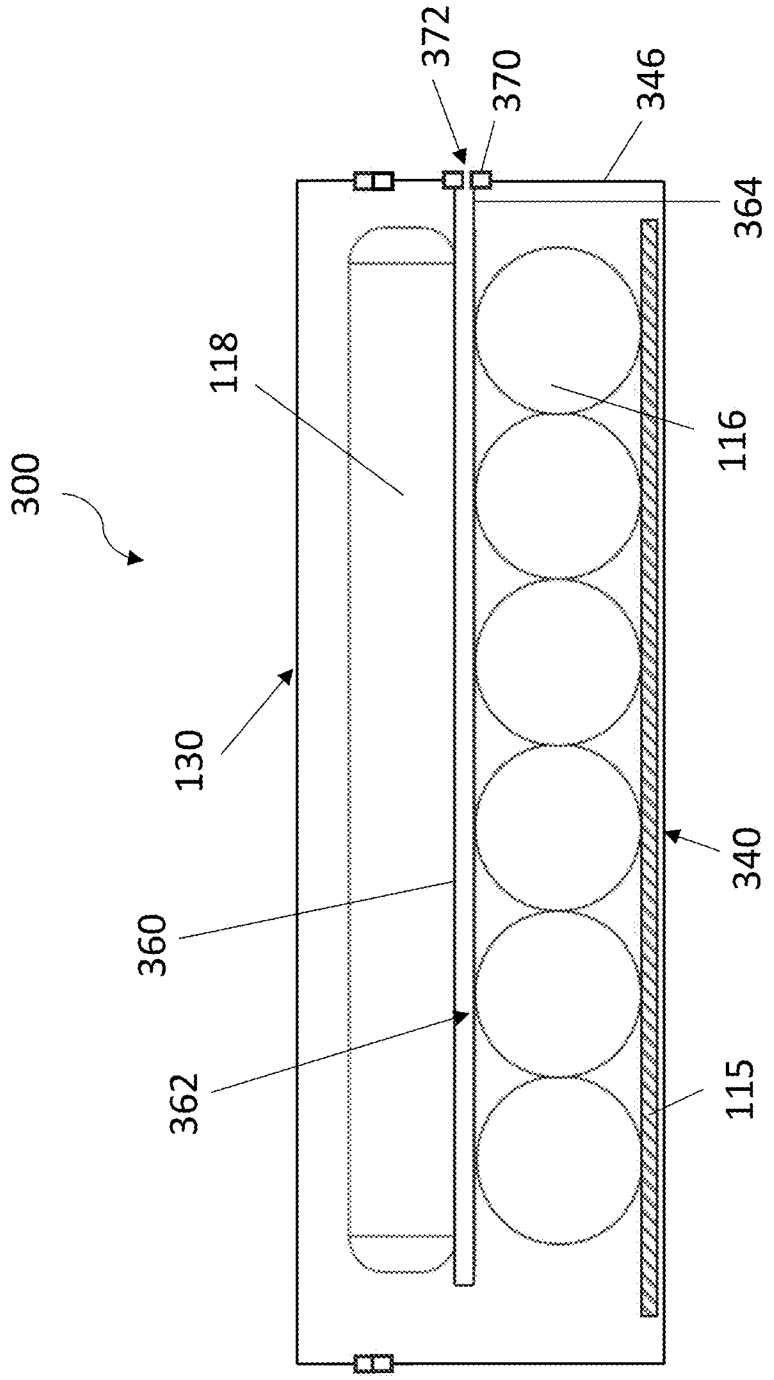
FIG. 9 is a cross-sectional view of a mattress according to another embodiment with a non-removable sleeve.

In another embodiment, referring now to FIG. 9, a mattress 300 has a sleeve 360 that is permanently attached to the bottom cover 340 of the mattress cover 320. The open lateral end 364 of the sleeve 360 is directly and permanently fastened to the bottom cover 340 (e.g., via welding or sewing). In this example, there is no need to use a linking strip as for the mattresses 100 and 200, to link between the side lower wall 346 and the sleeve 360. The X-ray cassette may therefore be inserted to and removed from an internal space 362 of the sleeve 360 from one lateral side of the bottom cover 340 of the mattress 200. The bottom cover 340 further includes an external fastener 370 around the edge of the opening 372 for selective opening and closing of the opening 372. It should be understood that, as in the previous example, the elements of the mattress 300 that are similar to the mattress 100 have been labeled with the same reference numerals.

While the sleeves described in the previous embodiments are oriented such that the X-ray cassette is inserted therein at the lateral side of the mattress, it is contemplated that, in other embodiments, the sleeve could be oriented such that the X-ray cassette is inserted therein at a longitudinal end of the mattress such as the head end or the foot end. In such embodiments, the corresponding opening allowing access to such sleeve would be provided at the head end or foot end of such mattress.

In some embodiments, the opening may be defined by the top cover 130 rather than the bottom cover of such mattress.

Figure 10:
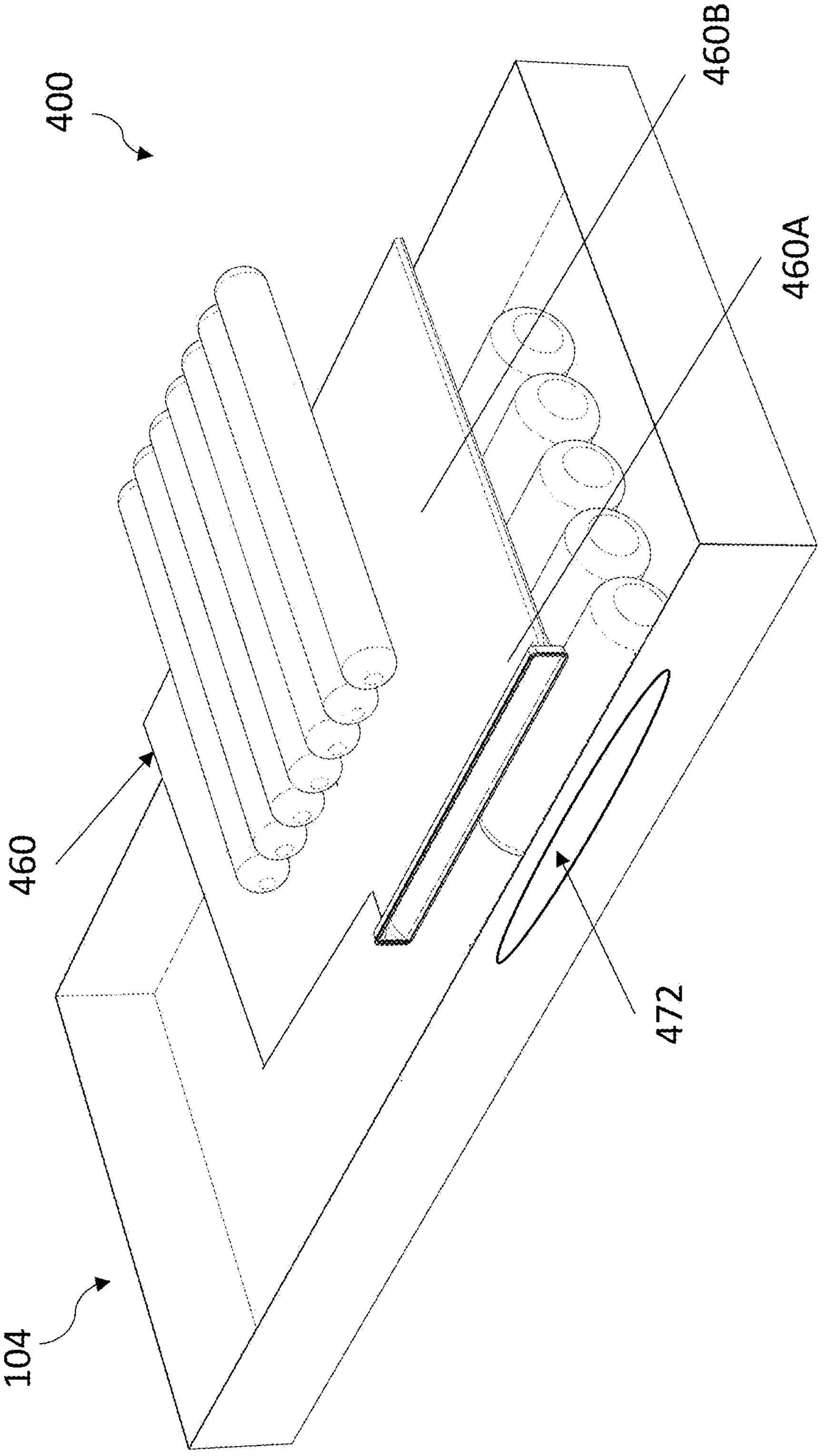
FIG. 10 is an exploded view of a part of a mattress having an L-Shaped sleeve, according to another embodiment.

While the sleeves shown in FIGS. 1 to 9 have a substantially rectangular shape, sleeves can have different shapes in other embodiments. For example, in one embodiment, as shown in FIG. 10, the sleeve 460 defines a first rectangular portion 460A near an opening 472 and a second rectangular portion 460B near a transversally central section of the mattress 400, creating a generally L-shaped sleeve. The second rectangular portion 460B has a greater longitudinal size than the first rectangular portion 460A, thus, the second rectangular portion 460B extends longitudinally towards the foot end 104 of the mattress 400 more than the first rectangular portion 460A. This configuration could be useful, for example, when it is needed to slide the X-Ray cassette 190 further towards the feet of the patient without the need for a larger opening 472.

Figure 11:
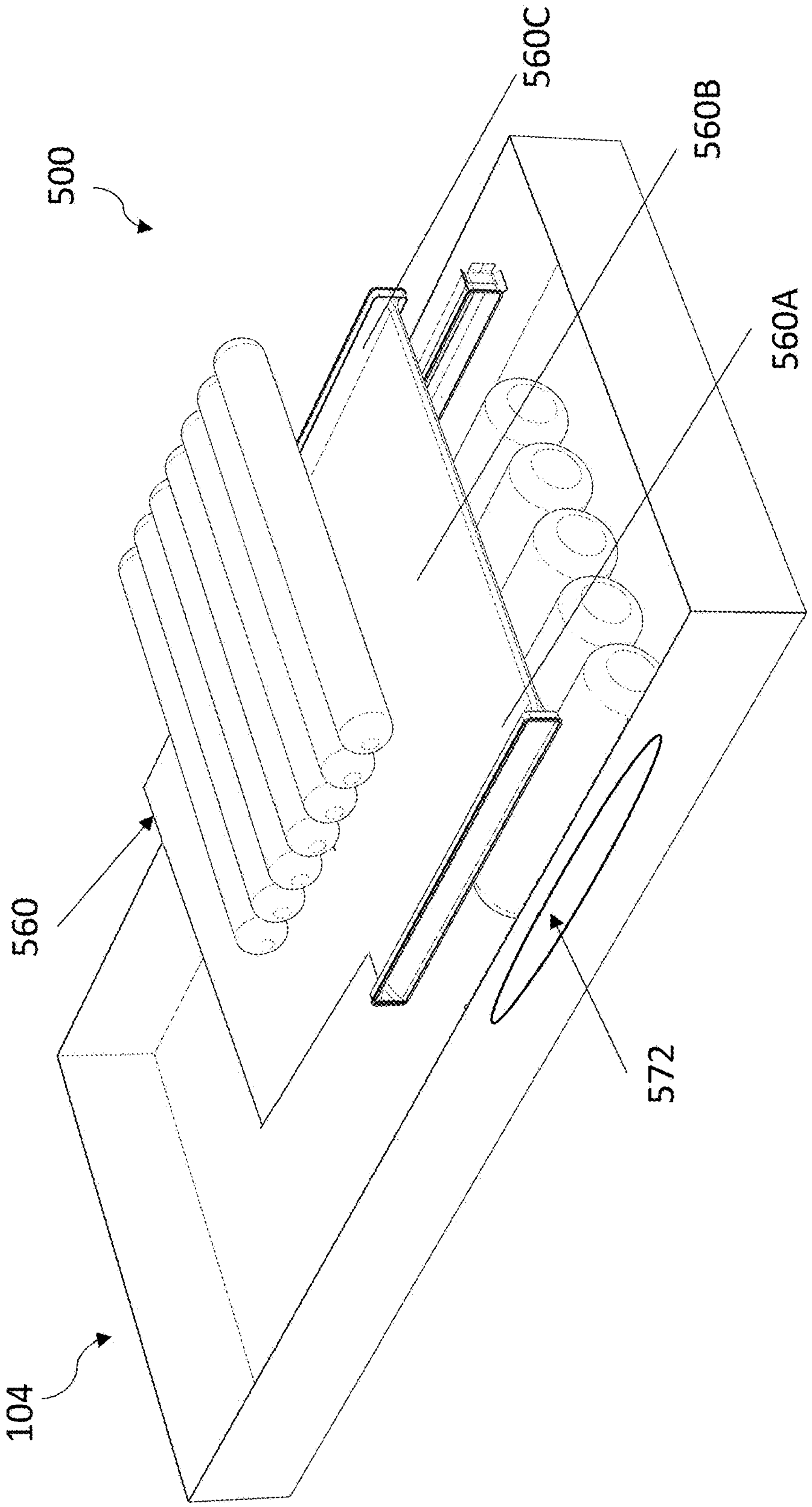
FIG. 11 is an exploded view of a part of a mattress having a T-Shaped sleeve, according to another embodiment.

In another embodiment, as shown in FIG. 11, the sleeve 560 defines a first rectangular portion 560A near an opening 572 of the mattress 500, a second rectangular portion 560B near a transversally central section of the mattress 500, and a third rectangular portion 560C, substantially symmetric to the first rectangular portion 560A, near a second opening 572' of the mattress 500. The second rectangular portion 560B has a greater longitudinal size than the first rectangular portion 560A and the second rectangular portion 560C, thus, the second rectangular portion extends longitudinally towards the foot end 104 of the mattress 500 more than the first rectangular portion 560A and the second rectangular portion 560C, creating a T-shaped sleeve.

The X-ray sleeve can be provided on mattresses with different structures. For example, in one embodiment, the sleeve is adaptable to be used in a foldable patient support surface. An example of such a foldable patient support surface has a notch in its structure and is described in U.S. Provisional Patent Application 63/693,934 filed on Sep. 12, 2024 and hereby incorporated by reference. In this embodiment, the sleeve is sized to be provided on either side of the notch or is made of a substantially flexible material that can be folded along with the other components of the core of the mattress as the mattress is folded.

Figure 12:
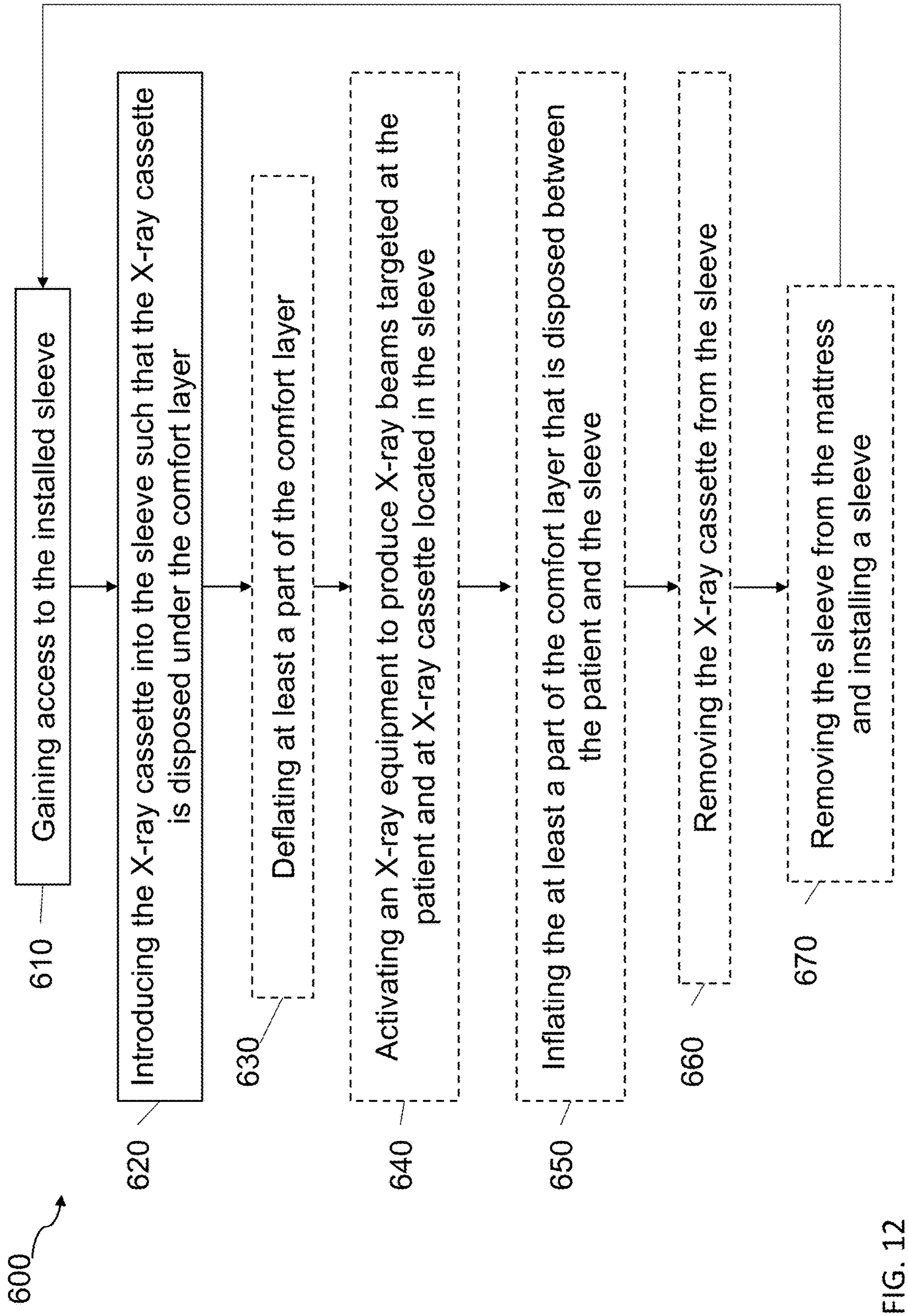
FIG. 12 is a flowchart illustrating main steps of an example method for operating the mattress for diagnostic imaging with an X-ray cassette.

An example of a method 600, as shown in FIG. 12, for operating the mattress for diagnostic imaging with the X-ray cassette 190 will now be described in greater detail. The method will be described with reference to the embodiment of the mattress shown in FIGS. 1 to 6 but other embodiments could be used.

In use, the mattress is placed on a patient support apparatus such as a hospital bed or a stretcher. The method 600 begins, at step 610, by a user (e.g., a caregiver, medical staff, etc.) gaining access to the sleeve 160 disposed inside of the mattress cover 120. To that end, in this embodiment, the user moves to gain access to one of the openings 172, 172' defined by the mattress cover 120. The user may need to open fasteners 170, 170' in order to expose the corresponding opening 172, 172' and therefore gain access to the internal space 162 of the sleeve 160.

The user then introduces, at step 620, the X-ray cassette 190 into the sleeve 160. Because of the configuration of the sleeve within the mattress, the X-ray cassette 190 will be disposed under the first layer, for example under the comfort layer 114 including the inflatable comfort bladders 118. The insertion of the X-ray cassette 190 into the sleeve 160 can be done while the patient remains on the mattress 100. The insertion of the X-ray cassette can be done without modifying the inflation (i.e., pressurization) of the mattress layers.

After placing the X-ray cassette 190 in the sleeve 160, the user optionally enters an input command at user interface 117 at step 630 so as to cause the pneumatic control assembly 113 to deflate (i.e., depressurize) at least a part of the comfort layer 114, namely the part of the comfort layer 114 that is disposed between the patient and the sleeve 160. In other words, the user causes the pneumatic control assembly 113 to reduce the pressure in the comfort bladders 118 of the comfort layer 114 that are disposed between the patient and the sleeve 160. This reduces the distance between the patient and the X-ray cassette 190 located in the sleeve 160. By deflating the comfort layer 114, clearer imaging may be obtained once the X-ray image is captured. This may also reduce interference from the air within the comfort bladders 118 of the comfort layer 114 such that high-quality X-ray images may be obtained. The user interface can be provided on the bed supporting the mattress 100 and is in communication with the pneumatic control assembly 113.

The user activates, at step 640, an X-ray equipment, namely an X-ray generator, to produce X-ray beams targeted at the patient and at X-ray cassette 190 located in the sleeve 160, thereby capturing an X-ray image of part of the patient's body on the X-ray film contained by the X-ray cassette 190. In particular, in this embodiment, an X-ray image of the torso of the patient is captured on the X-ray film. In another embodiment with a longer sleeve, an X-ray image of most of the body of the patient is captured on the X-ray film.

After successful imaging, the user enters an input command at the user interface 117, at optional step 650, so as to cause the pneumatic control assembly 113 to pressurize (i.e. to inflate) the part of the comfort layer 114 that is disposed between the patient and the sleeve 160 to an adequate supporting pressure, if it was previously deflated. In other words, the user causes the pneumatic control assembly 113 to reinflate the comfort layer 114 so that the patient can comfortably be supported thereby.

The X-ray cassette 190 can be removed from the sleeve 160, at step 660. The X-ray film can then be removed from the X-ray cassette 190 to analyze the image captured during the procedure.

Optionally, at step 670, the sleeve 160 can be removed from the mattress 100 to allow its cleaning, maintenance or replacement. The same or a different sleeve 160 is then installed in the mattress to allow a next use.

Modifications and improvements to the above-described embodiments of the present technology may become apparent to those skilled in the art. The foregoing description is intended to be exemplary rather than limiting.

The invention claimed is:

1. A support surface for a patient support apparatus, the support surface being adapted for supporting a patient, the support surface extending from a head end to a foot end along a longitudinal direction, and extending between two opposite lateral sides along a transversal direction, the support surface comprising: a first layer, wherein the first layer is a comfort layer, the comfort layer comprising a plurality of inflatable comfort bladders, the comfort bladders being adapted to be pressurized to a desired pressure, chosen from a range between a completely deflated state to a fully inflated state; a second layer disposed below the first layer, wherein the second layer is a support layer, the support layer comprising a plurality of inflatable support bladders; a cover enclosing the first layer and the second layer, said cover having an opening; and a sleeve coupled to the cover, the sleeve defining an internal space for receiving a medical device, the sleeve being sandwiched between the first layer and the second layer, the internal space and the opening collaborating to allow access to the internal space from an exterior of the cover; whereby the medical device is configured to be inserted in and removed from the internal space of the sleeve through the opening from an exterior of the support surface.

2. The support surface of claim 1, wherein:

the sleeve has a substantially flat rectangular shape and extends, along the transversal direction, from the opening; and the opening is located at one of the lateral sides of the cover.

3. The support surface of claim 2, wherein: the opening is a first opening and the one of the lateral sides of the cover is a first lateral side; the cover defines a second opening at a second lateral side, the second opening being in communication with the internal space of the sleeve, whereby the medical device is configured to be inserted into the internal space of the sleeve via one of the first opening and the second opening.

4. The support surface of claim 2, further comprising a peripheral flap connected to the one of the lateral sides, the flap extending downwardly to cover the opening.

5. The support surface of claim 1, wherein:

the cover comprises a top cover and bottom cover that are removably secured to one another; and the bottom cover defines the opening.

6. The support surface of claim 1, wherein the opening comprises a fastener that is configured to be selectively opened to gain access to the opening and closed to prevent access to the opening.

7. The support surface of claim 1, wherein the sleeve extends longitudinally along a torso portion of the support surface located closer to said head end than said foot end.

8. The support surface of claim 1, wherein the sleeve includes a first rectangular portion having a first longitudinal size and a second rectangular portion having a second longitudinal size, the second longitudinal size being greater than the first longitudinal size, whereby the sleeve is substantially L-shaped.

9. The support surface of claim 1, wherein the sleeve includes a first rectangular portion having a first longitudinal size, a second rectangular portion having a second longitudinal size, and a third rectangular portion having a third longitudinal size, the second longitudinal size being greater than the first longitudinal size and the third longitudinal size, whereby the sleeve is substantially T-shaped.

10. The support surface of claim 1, wherein the sleeve is removably secured to the cover.

11. The support surface of claim 10, further comprising a zip fastener selectively fastening the sleeve to the cover.

12. The support surface of claim 1, wherein the second layer further comprises a foam layer below the support layer.

13. The support surface of claim 1, wherein the medical device is an X-ray cassette.

* * * * *